(12) United States Patent
Ng

(10) Patent No.: US 10,736,283 B2
(45) Date of Patent: Aug. 11, 2020

(54) ROTATABLE RACK SYSTEM

(71) Applicant: SKY URBAN IP PTE LTD, Singapore (SG)

(72) Inventor: Jack Soon Hoe Ng, Singapore (SG)

(73) Assignee: SKY URBAN IP PTE LTD, Singapore (SG)

( * ) Notice: Subject to any disclaimer, the term of this patent is extended or adjusted under 35 U.S.C. 154(b) by 406 days.

(21) Appl. No.: 15/118,846

(22) PCT Filed: Feb. 10, 2015

(86) PCT No.: PCT/SG2015/050018
§ 371 (c)(1),
(2) Date: Aug. 12, 2016

(87) PCT Pub. No.: WO2015/122849
PCT Pub. Date: Aug. 20, 2015

(65) Prior Publication Data
US 2017/0055471 A1    Mar. 2, 2017

(30) Foreign Application Priority Data

Feb. 13, 2014   (SG) .................... 2014014302

(51) Int. Cl.
*A01G 31/04*       (2006.01)
*A01G 22/00*       (2018.01)
(Continued)

(52) U.S. Cl.
CPC .......... *A01G 31/042* (2013.01); *A01G 9/022* (2013.01); *A01G 22/00* (2018.02); *A01G 27/008* (2013.01); *A01G 31/047* (2013.01); *Y02P 60/216* (2015.11)

(58) Field of Classification Search
CPC ........ A01G 31/042; A01G 1/001; A01G 9/20; A01G 9/022; A01G 22/00; A01G 27/008;
(Continued)

(56) References Cited

U.S. PATENT DOCUMENTS 3,254,447 A * 6/1966 Othmar ................ A01G 31/042
                                                            47/65
3,339,308 A * 9/1967 Clare .................... A01G 31/047
                                                            47/79
(Continued)

FOREIGN PATENT DOCUMENTS

CA       2659658 A1 *  9/2010  ............... A01G 9/00
CA       2809941 A1 *  3/2012  ........... A01G 31/042
(Continued)

OTHER PUBLICATIONS

International Search Report & Written Opinion; International Preliminary Report and Patentability.

*Primary Examiner* — Ebony E Evans
(74) *Attorney, Agent, or Firm* — Joseph G. Chu; Jeremy I. Maryland; JCIP

(57) ABSTRACT

A rotatable rack system for growing plants is disclosed which has a frame, a plurality of mobile trays arrayed around the frame, where each mobile tray contains at least one plant and a chain linking said plurality of mobile trays together, supported by the frame with a drive mechanism configured to drive the chain wherein the frame is configured to support the plurality of mobile trays encircling an enclosed space. Several configurations of the frame that are equally energy efficient are also disclosed, along with a method of growing plants using the system.

10 Claims, 7 Drawing Sheets

(51) Int. Cl.
*A01G 9/02* (2018.01)
*A01G 27/00* (2006.01)

(58) Field of Classification Search
CPC .... A01G 31/045; A01G 31/047; A01G 31/02; A01G 31/06; B66F 7/065; B66F 17/16; B66F 17/123
USPC .......................................................... 47/66.7
See application file for complete search history.

(56) References Cited

U.S. PATENT DOCUMENTS

| | | | |
|---|---|---|---|
| 4,317,308 A | 3/1982 | Derrick et al. | |
| 4,345,160 A | 8/1982 | Smith | |
| 8,151,518 B2 * | 4/2012 | Adams | A01G 31/06 47/82 |
| 10,112,814 B1 * | 10/2018 | Shelor | A01G 7/045 |
| 2006/0230674 A1 * | 10/2006 | Marchildon | A01G 31/047 47/60 |
| 2012/0325756 A1 | 12/2012 | Zahra | |

FOREIGN PATENT DOCUMENTS

| | | | |
|---|---|---|---|
| CN | 202385599 U | 8/2012 | |
| DE | 1507018 A1 * | 6/1969 | ............. A01G 9/143 |
| DE | 1582741 A1 | 6/1970 | |
| FR | 2828060 A1 | 2/2003 | |
| FR | 2954674 A1 | 7/2011 | |
| FR | 3053569 A1 * | 1/2018 | .......... A01G 31/042 |
| GB | 2040658 A * | 9/1980 | .............. A01G 9/00 |
| JP | 2011087563 A | 5/2011 | |
| KR | 2020100011403 U | 11/2010 | |
| SU | 1722301 A1 | 3/1992 | |
| WO | WO-9217053 A1 * | 10/1992 | .......... A01G 31/042 |
| WO | 2011067548 A1 | 6/2011 | |
| WO | 2012/030298 A1 | 3/2012 | |

\* cited by examiner

ROTATABLE RACK SYSTEM

FIELD OF THE INVENTION

The present invention relates to a rotatable rack. More particularly, the rotatable rack may be used (but not limited to) growing vegetables and will be described in such context.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Vertical farming is a new concept for many, which comprises of growing plants and vegetables by stacking them vertically in shelves in order to conserve the amount of land required. This is especially important as cities get more urbanized and land becomes scarcer. Further, by reducing the distance and number of steps between the farms, the consumer is able to purchase fresher and better quality produce, with less wastage and a smaller carbon footprint.

One solution to vertical farming is to place the plants and vegetables in racks, preferably in a greenhouse type of environment in an enclosed space. However, these requires heavy manpower and equipment in order to harvest and cultivate the plants, and because the plant require light in order to grow, artificial light must be provided, drawing large amounts of energy to do so.

Another solution is to have the racks placed in a rotating carousel, like a Ferris wheel, which would enable easy access to the plants and vegetables. However, conventional solutions to date still require machinery and power to run the carousel, as well as equipment to irrigate the plants and ensure sufficient nutrients.

The present invention seeks to provide an apparatus, system and method of farming that alleviates the above mentioned drawbacks at least in part.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

The above and other problems are solved and an improvement in the art is made by a system in accordance with this invention.

A first advantage of the apparatus in accordance with this invention is that it allows for a greater number of plants to be grown in a smaller land area. This is especially important in land scarce areas and countries, as well as for future urban farming requirements, by even placing it on the tops of buildings. A second advantage of the apparatus in accordance with this invention is the low energy requirements to grow the plants. By making the system relatively self-sufficient and autonomous, labour requirements are reduced drastically and provide efficient growing of plants and vegetables. A third advantage of the apparatus in accordance with this invention is high quality and high yield of the plants grown. By providing the right amount of sunlight, water and nutrients, the plants grown by the apparatus have been found to be healthier and more abundant.

In accordance with an aspect of the invention there is a rotatable rack system for growing plants, the rack system comprising: a frame; a plurality of mobile trays arrayed around the frame, each mobile tray for holding at least one plant; a chain linking said plurality of mobile trays together; a drive mechanism configured to drive the chain; wherein the frame is configured to support the plurality of mobile trays encircling an enclosed space.

In an alternate embodiment, the frame has a first side and a second side, such that the gradient of the first side differs from the gradient of the second side, such that the trays on the first side requires less effort to drive the chain than on the second side. In another embodiment, an irrigation system for supplying water to the rotatable rack system is also included. The irrigation also supplies water to the drive mechanism which is powered by a water wheel. The irrigation system can also include a tray with water in which the mobile trays are allowed to at least partially immerse in. And the irrigation system can also include a water tank in fluid connection with the tray.

In yet another embodiment, the water wheel includes a device for controlling the rate of rotation of the water wheel, which affects the rate of movement of the chain. This water wheel can also include a port for an external crank that allows for the water wheel to be rotated manually.

In a further embodiment, a chain guide may be included that guides the chain, the chain guide also being able to lock the trays in place in the event of a break in the chain. In another embodiment, each of the mobile trays are mounted via at least one attachment to the chain, the attachment configured to allow the mobile trays to rotate and maintain a substantially horizontal position. The attachment has a pivot point which allows the mobile tray to swivel freely about the pivot point. The mobile tray may also be mounted distally from the pivot point via an extension arm. And the attachment may include at least one ball bearing to allow the mobile tray to swivel freely.

In a further embodiment, the drive mechanism may be powered by at least one electromagnet. In yet a further embodiment, the drive mechanism may be powered by one or a combination of water, wind, solar, and electric power. And the drive mechanism may be positioned within the enclosed space.

In another embodiment, the frame may be circularly shaped. In yet another embodiment, the frame may be hexagonally shaped.

In a further embodiment, the enclosed space may be large enough to park at least one vehicle.

In accordance with an embodiment of the invention provides a method of growing plants comprising the steps of: providing a plurality of mobile trays for plants to grow in, rotating the mobile trays along a frame via a drive mechanism, irrigating at least one mobile tray via an irrigation system, wherein said irrigation system also powers the drive mechanism via a water wheel.

In another embodiment, the frame may include a first side and a second side, wherein the gradient of the first side differs from the gradient of the second side, such that the mobile trays on the first side of the frame requires less effort to move than on the second side of the frame.

A further embodiment may further include the step of manually rotating the water wheel via an external device plugged into the water wheel.

In yet another embodiment, the water wheel may be replaced by an electromagnetic motor. In yet a further embodiment, the drive mechanism may be powered by one or a combination of water, wind, solar, and electric power.

Another aspect of the invention provides a system of growing plants comprising: a plurality of rotatable rack systems, each rotatable rack system comprising: a frame; a plurality of mobile trays arrayed around the frame, each mobile tray having at least one plant; a chain linking said plurality of mobile trays together; a drive mechanism configured to drive the chain; wherein the frame is configured to support the plurality of mobile trays encircling an enclosed space, an irrigation system for supplying water to at least one rotatable rack system comprising: a water storage tank fluidly connected to the irrigation system via a plumbing system, wherein said plumbing system provides substantially constant water pressure to the plurality of rotatable rack systems.

In alternate embodiments, the irrigation system supplies water to at least one drive mechanism of the rotatable rack system, wherein the drive mechanism includes a water wheel.

In further embodiments may also include a chain guide that guides the chain while the chain is moving on the frame, said chain guide also being able to lock the trays in place in the event the chain breaks. The mobile trays may be mounted via at least one attachment to the chain, the attachment configured to allow the mobile trays to rotate and maintain a substantially horizontal position. The attachment may have a pivot point which allows said mobile tray to swivel freely about the pivot point. The mobile tray may be mounted distally from the pivot point via an extension arm.

In another embodiment, the attachment may include at least one ball bearing to allow the mobile tray to swivel freely.

In alternate embodiments, the drive mechanism may be powered by at least one electromagnet. In a further embodiment, the drive mechanism may be powered by one or a combination of water, wind, solar, and electric power. Further, the drive mechanism may be positioned within the enclosed space.

In further embodiments, the frame may be circularly shaped. Alternatively, the frame may be hexagonally shaped.

In yet further embodiments, the enclosed space is large enough to park at least one vehicle. In alternate embodiments, the plurality of rotatable rack systems are placed in a greenhouse that is at least partially ventilated. In another embodiment, the plurality of rotatable rack systems enclose a space large enough to park at least one vehicle.

BRIEF DESCRIPTION OF THE DRAWINGS

The present invention will now be described, by way of example only, with reference to the accompanying drawings, in which.

Other arrangements of the invention are possible and, consequently, the accompanying drawings are not to be understood as superseding the generality of the preceding description of the invention.

PREFERRED EMBODIMENTS OF THE INVENTION

Particular embodiments of the present invention will now be described with reference to the accompanying drawings. The terminology used herein is for the purpose of describing particular embodiments only and is not intended to limit the scope of the present invention. Additionally, unless defined otherwise, all technical and scientific terms used herein have the same meanings as commonly understood by one or ordinary skill in the art to which this invention belongs. Embodiments of the present invention provide a rotatable vertical racking system and method which allows for the efficient use of both space and energy resources for growing plants. As will be described in more detail below, the preferred embodiment of the system and method may thus be considered "green" in every respect.

In the description, the terms 'rack' and 'tray' are used interchangeably.

Figure 1:
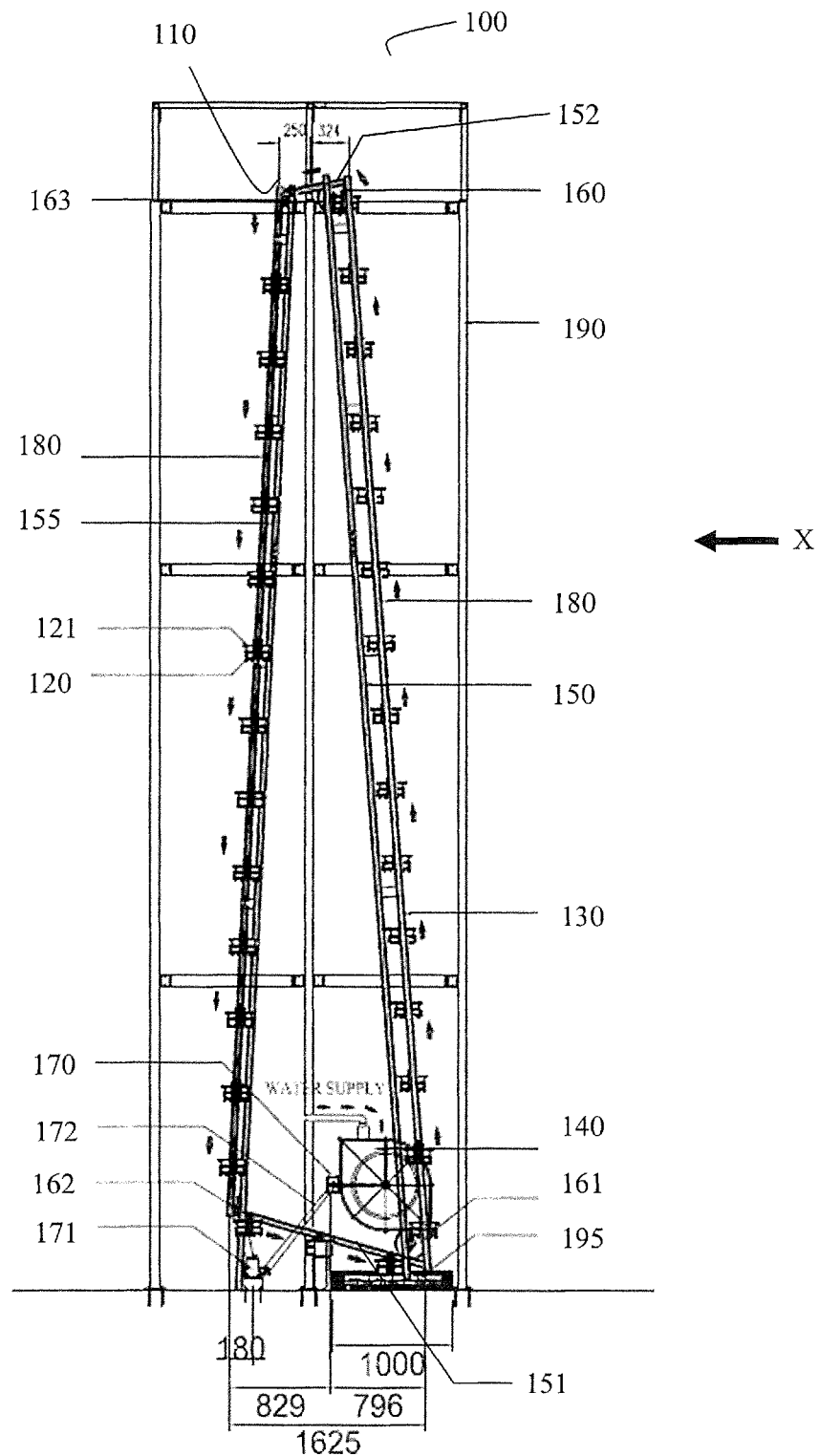
FIG. 1 is a side view of the embodiment of the invention showing the frame, the mobile trays and the drive mechanism.
Figure 2:
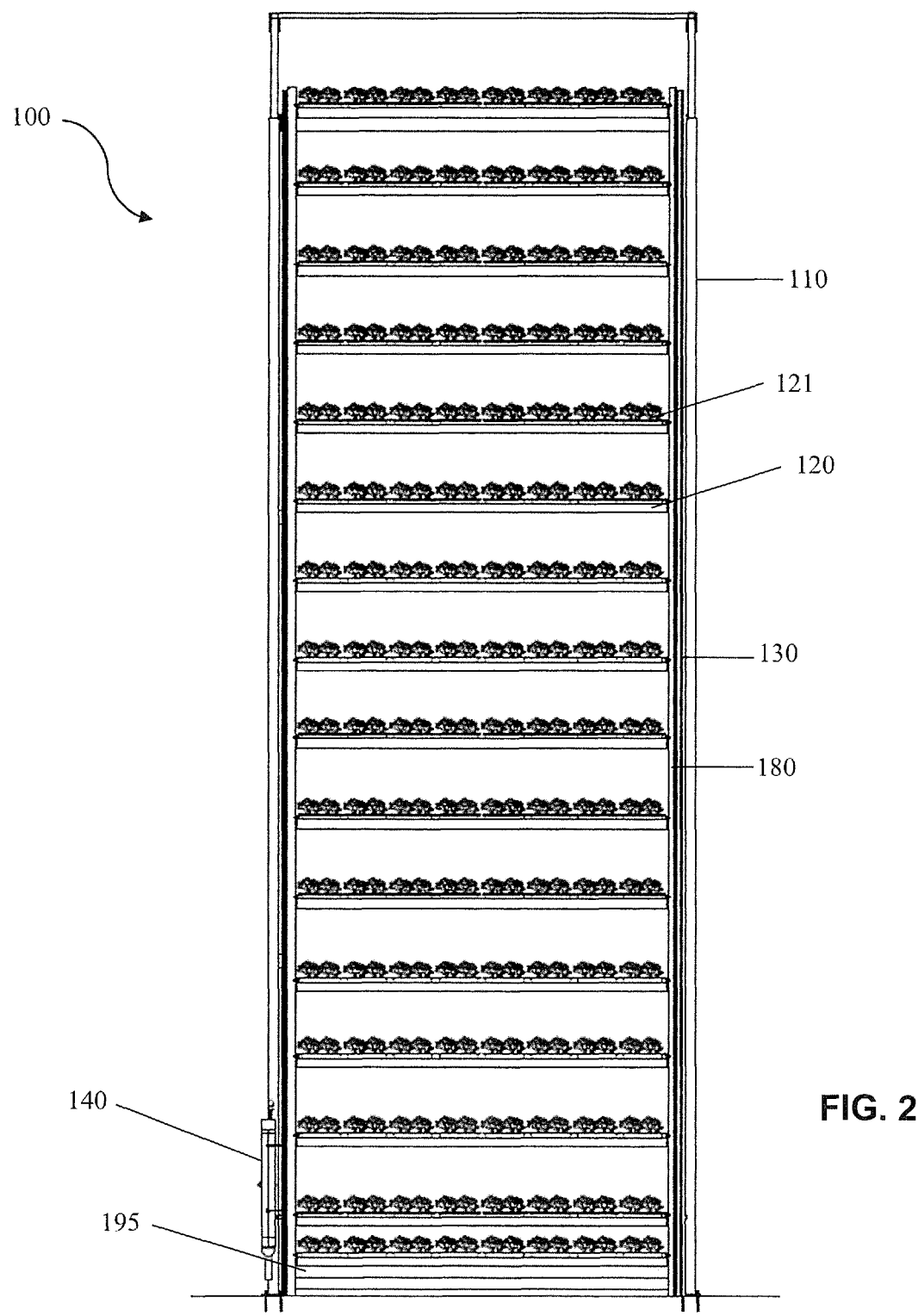
FIG. 2 is a view of the embodiment of the invention viewed from the direction of X in FIG. 1.

FIG. 1 shows a side view and FIG. 2 shows a view (from the direction of X of FIG. 1) of a rotatable rack system 100 for growing plants according to one embodiment of the present invention. The system 100 includes a frame 110 that has an array of trays 120. Each tray is arranged to hold a pot 121 with soil for growing a plant. Alternatively, the plants can be grown via hydroponics and the soil can be replaced by using mineral nutrient solutions in water. The shape of the frame 110 and number of mobile trays 120 on each side are designed to balance the weight on both sides of the frame 110 as well as reduce the amount of effort required by the drive mechanism to move the trays 120. Frame 110 may also be designed in a way where the weight of the mobile trays 120 on one side is greater than the other side so as to further reduce the amount of effort required by the drive mechanism to move the trays 120 (this will be further described below) The mobile trays 120 are linked via a chain 130 which rests on the frame. The term "chain" used throughout the specification refers to anything suitable for linking the mobile trays 120, which include but is not limited to belts and ropes. A drive mechanism is used to drive the chain, which rotates the mobile trays 120 around the frame 110 and in the embodiment depicted; the drive mechanism includes a water wheel 140. The chain 130 passes over a series of sprockets 160, 161, 162, 163 that allow the chain (and mobile trays 120) to move smoothly over the edges of the frame 110. The drive mechanism shown also includes a mechanical water wheel speed controller 170, operable to control the speed of rotation of a reducer 171. This mechanical water wheel speed control 170 is detachable, and may be used on another rotatable rack system if required. Speed controller 170 can be powered by the water wheel or an external tool to provide additional speed. This embodiment also shows a reducer 171 connected to the mechanical wheel speed control 170 via a separate chain 172 to allow the speed controller 170 to control the speed of the reducer. The reducer 171 is connected to the sprocket 162 that ensures the chain moves smoothly. Further, the sprocket 162 on both ends of the frame can be connected via a bar to ensure that the sprocket 162 turns at a consistent rate and ensuring that both ends of the mobile trays move at the same rate.

The water wheel 140 may be made from various materials including wood, plastic, metal composites, aluminium or mild steel and the water wheel has a diameter of approximately 2 meters, although this can be resized accordingly depending on the size of the growing operation. Further variations of the water wheel are possible where the pivot of the water wheel is shifted to achieve a desired combination of speed and torque. The water wheel 140 can also incorporate a suitable port for an external crank or motor to be in mechanical connection with the water wheel in order to rotate the water wheel manually (for example when no water source is present), thereby manually rotating the mobile racks 120 about the frame 110.

While drive mechanism in this embodiment uses water, the system 100 can also be powered by a wind turbine/pump assembly which provides the water power. Alternatively, a solar powered pump may be used. In these embodiments, the system 100 is thus completely self-sufficient without requiring any external energy source. A system of electromagnets can also be used to drive the system 100. In other alternate embodiments, the system 100 may be powered by electricity, or by any combination of water, wind, solar, and electric power.

It is understood that various ranges may be used to effect the number of rotations of the system 100 in a given period. By way of example and not limitation, the system 100 may be configured for the mobile tray 120 to complete anywhere between 0.5-20 rotations in a 24 hour period by adjusting the weight and spacing of the mobile trays 120, the various dimensions of the system 100, the amount of available sunlight, the drive mechanism, in this embodiment, that would be the flow rate of the water, etc.

The embodiment shown also features a chain guide 180 which comprises a portion, having for example, a C-shaped cross-section that guides the chain as it moves along the frame. The chain guide 180 also acts as a safety device in locking the mobile trays 120 in place in event the chain is broken. This prevents the mobile trays from free falling when there is a break in the chain. In particular, when a portion of the chain 130 is broken, the broken portion of chain 130 collapses within the chain guide 180, the collapsed broken chain portion forming an stopper within the chain guide 180 which prevents the chain (and the trays 120) from free-falling due to effects of gravity.

The frame 110 provides the support for the overall structure of the rotatable rack system, and in the embodiment shown, the mobile trays 120 are shown ascending on one side 150 and descending on another side 155. The side 150 is designed to be at a different level of inclination or gradient with respect to the side 155, so that less effort is required to hoist each mobile tray 120 to overcome the top of the frame 110. It would be appreciated by a skilled person that both sides 150 and 155 can also be substantially vertical, i.e. perpendicular to the ground where frame 110 is sited. Bottom bar 151 and top bar 152 connect sides 150, 155. There is substantially heavier load on side 155 and bottom bar 151 because they have more mobile trays 120 compared to side 150, although the mobile trays 120 on side 150 are hydrated with water after passing through water bath tray 195. As top bar 152 is relatively short, a mobile tray 120 will generally not be positioned there. The heavier load on side 155 and bottom bar 151 exerts a net downward force to pull the mobile trays 120 up the side 150. This achieves energy savings since less effort is required to move the trays 120. It is also contemplated that the load on side 155 and bottom bar 151 may be equal to and balances the load on side 150, such that the drive mechanism requires minimal effort in moving the mobile trays 120 about frame 110. The bars 151, 152 connecting the sides can be either horizontal, or slanted at an angle as shown in FIG. 1 to provide further assistance to the drive mechanism in driving the chain and the mobile trays. This would also allow the load on one side of the frame, which may be heavier, to pull the load on the other side of the frame, thereby achieving energy savings and requiring less effort to drive the mobile trays.

In this embodiment, the enclosed space encircled by the frame 110 is shown to contain the drive mechanism for the purposes of reducing the carbon footprint of the frame 110. Further embodiments of usage of this enclosure within the frame are shown in FIGS. 3-10 and will be described later in the description.

It is understood that various configurations for the frame 110 may be used depending on the size of the mobile trays and the number of drive mechanisms 140. In the embodiment shown, the mobile trays 120 may be approximately 300 mm×30 mm×75 mm and the frame 110 is approximately 1625 mm wide at the bottom and 574 mm wide the top. Variations of the dimensions can be carried out based on the requirements and the frame can be as high as 3 m, 6 m or even 9 m, and the distance between trays and number of trays can be customised based on the plant being grown and height of the tray required. The dimensions shown also create inclinations on the sides that differ, in this case, the inclinations by 2 degrees, but one skilled in the art would be able to vary this to achieve the same result: that it would take less effort to drive the chain around the frame due to requiring less force with the assistance of gravity, reducing the load on the chain and force required to move the trays. This difference also helps to balance the load between the two sides of the frame, for example, the side that is longer would be supporting more trays than the other side, also if one side mobile trays that have just passed through the water bath tray 195 the mobile trays would be heavier, balancing out the other side.

The frame 110 is supported by a support structure 190 consisting of various support elements that may be joined together using, by way of example and not limitation, various types of mechanical fasteners, brackets, welding, brazing, etc. The frame 110 may be made from any material capable of supporting the weight of the rotatable rack system, for example metal, hard plastic, composite material, wood, etc. The entire system may be enclosed in a greenhouse to ensure that the optimal environment is provided. The greenhouse is designed to allow sunlight in to grow the plants while maintaining the right environment for the plants to be grown.

The mobile tray 120 is a tray that can be moved, as the drive mechanism moves and rotates the trays around the frame by driving the chain 130.

Individual mobile trays can also swivel freely about its attachment to the frame 110, allowing the trays to maintain substantially horizontal while the trays rotate around the frame. Each of the mobile trays 120 may have one or more compartments or plastic pots 121 configured to receive a plant and the plants may be contained within trays, usually made of polystyrene although other materials may also be used. Each of the mobile trays may include multiple compartments for holding individual plants, depending on the type of plants being grown, space available, etc., and the frame 110, mobile trays 120 and the plastic pots 121 may have any desired dimensions or configurations both larger and smaller than the embodiment shown. The distance between trays and the number of trays on the frame is another consideration as it is dictated by the height and size of the plant. For cultivating taller or heavier plants, less trays may be used on the frame and spaced apart accordingly. For better load balancing, the trays can be spaced out evenly, maintaining a fixed distance between trays.

The height difference between the trays can be adjusted to suit different plants/crops/vegetables. The depth of the mobile trays can also be easily customised for other vegetables requiring deeper or wider spacings. The water supply to the plants can also be controlled to ensure optimal growth patterns. Artificial lighting may be used to offset any unexpected changes in weather, for example on cloudy or rainy days where natural sunlight is scarce. Similarly, the size of the frame 110 may be adjusted depending on the specific application. For example, a very large frame (10 meters high or larger) may be used in commercial applications, while a 1 meter frame may be provided in a domestic context, e.g. positioned in a residential home balcony.

The present embodiment also discloses an irrigation system that utilizes the movement of the mobile trays 120 to provide water and nutrients to the plants via a water bath tray 195. This water bath tray 195 can be fluidly connected to the water wheel 140 to catch the water that has driven the water wheel. The plants are irrigated by dipping the mobile trays 120 into the water bath tray 195. To aid in this, one or more mobile trays 120 can have perforations at the base of the tray 120 to allow the plants or soil to have access to the water. By controlling the water level in the water bath tray 195, the amount of water the plants receive is also controlled, ensuring that over hydration does not occur. The water bath tray 195 can have more than one outlet at different heights to vary the level of the water in the water bath tray 195. This open irrigation system also assists the greenhouse in maintaining the optimal environment required for plants to grow. Alternatively, the plants may be irrigated by a shower system, where the water used to drive water wheel 140 is collected and showered over the plants. The irrigation system would draw water from a storage tank for the water (not shown) and supply this to the water wheel which would drive the mobile trays around the frame, as well as irrigate the plants. Further, nutrients can be added to the water via the storage tank for the plants to grow better. This storage tank can be shared with other rotatable rack systems and this is disclosed later in the description.

In a further embodiment, the mobile trays may be mounted to the chain via suitable attachments which have points at which such mobile trays can pivot. The mobile trays can also be distally mounted to the chain for better stability, via an extension arm from the attachments to lower the centre of gravity and prevent unnecessary swaying of the mobile tray (this is illustrated further in FIG. 3). The attachments and/or the points at which the mobile trays pivot, can contain ball bearings to allow the mobile tray to freely rotate or swivel.

Figure 3:
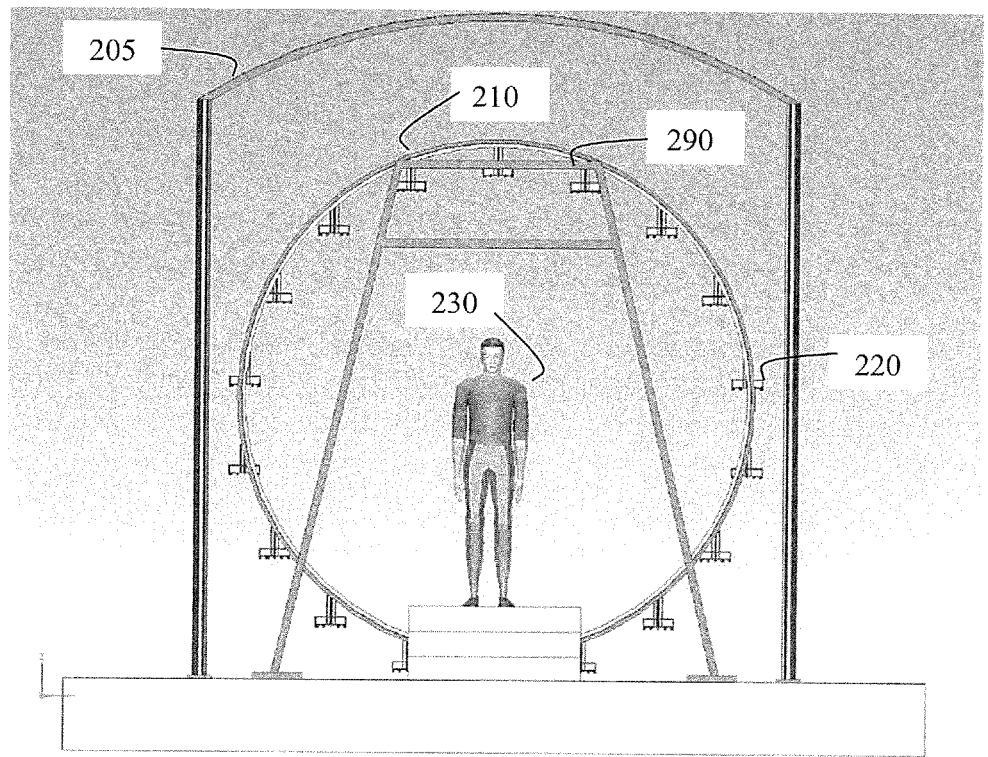
FIG. 3 shows an alternative embodiment of the invention with a circularly shaped frame.
Figure 4:
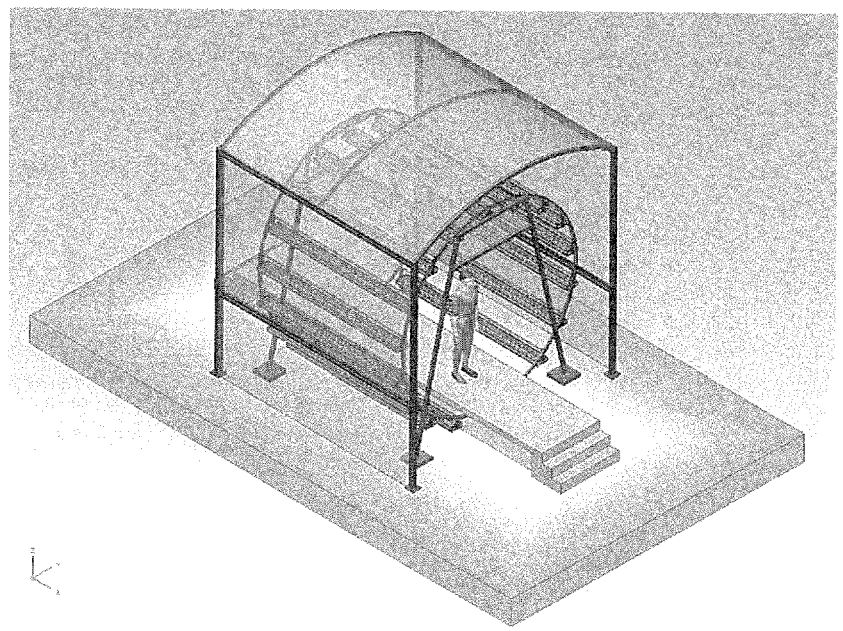
FIG. 4 shows a perspective view of the alternative embodiment shown in FIG. 3.

FIG. 3 shows an alternative embodiment from the same view, with the greenhouse 205 shown. Using the same reference numerals to illustrate, the frame 210 here is shown to be circular in shape, which assists in the movement of the mobile trays 220. For clarity, the drive mechanism is not illustrated. As an example, a human figure 230 is illustrated for a sense of scale as well as purpose as it is envisaged that this embodiment can be placed in areas of high human traffic, by using a series of systems using this embodiment to replace existing covered walkways thus providing plants or produce while providing shade. Since the system can be self-sufficient, it would require minimal manpower to maintain and service. Further, a single system of this embodiment can be scaled to provide shade for parked vehicles. FIG. 4 shows the same alternative embodiment in a perspective view.

Figure 5:
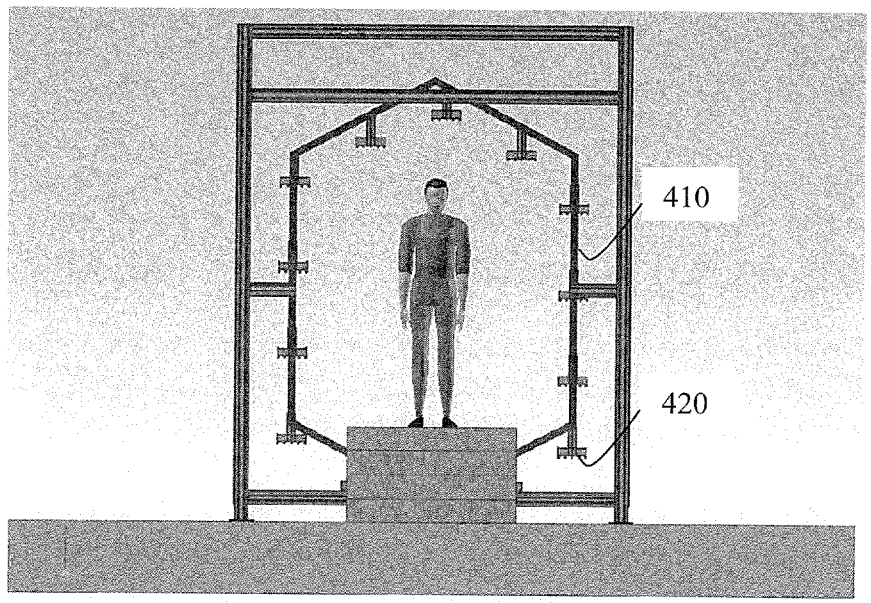
FIG. 5 shows a further alternative embodiment of the invention with a hexagonally shaped frame.
Figure 6:
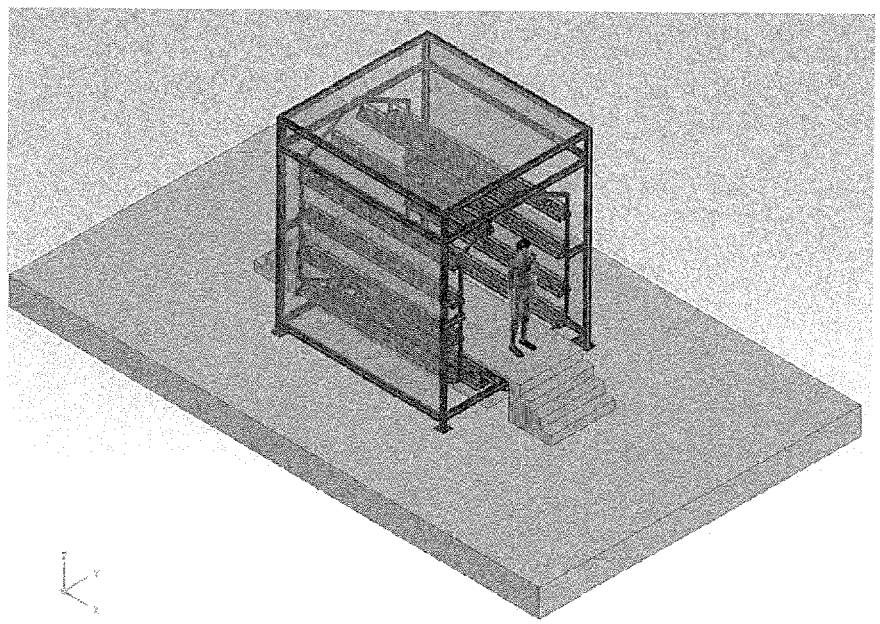
FIG. 6 shows a perspective view of the alternative embodiment shown in FIG. 5.
Figure 7:
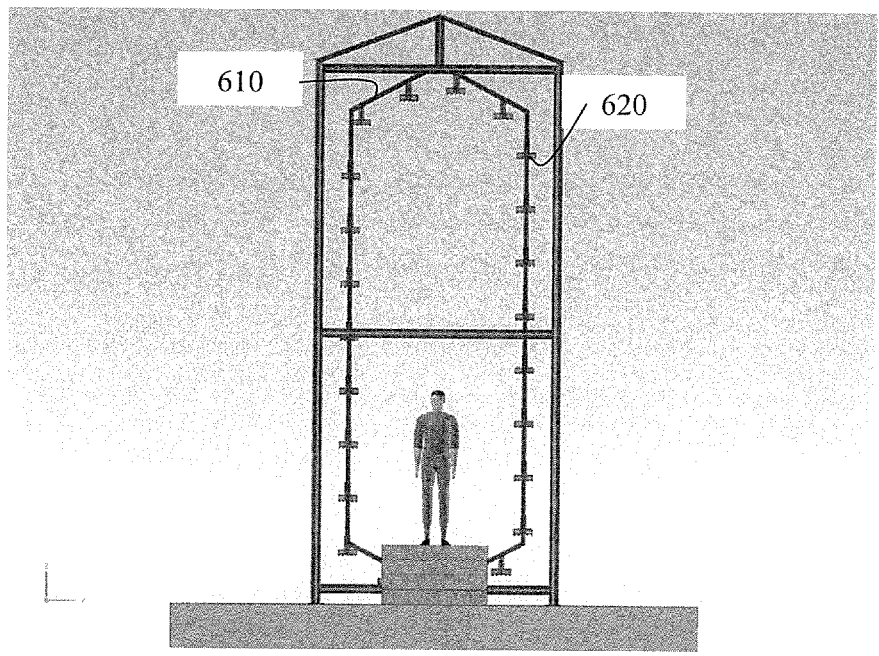
FIG. 7 shows a further embodiment of the invention base on the hexagonally shaped frame in FIG. 5 but with an extended frame.

FIG. 5 shows another alternative embodiment of the system, specifically a frame 410 is shown to be hexagonal in shape, which assists in the movement of the mobile trays 420. Again the drive mechanism is not illustrated for clarity. Similar to the previous embodiment, this embodiment can be placed in areas of high human traffic, by using a series of systems using this embodiment to replace existing covered walkways thus providing plants or produce while providing shade, while requiring minimal manpower to maintain and service. Further, a single system of this embodiment can be scaled to provide shade for parked vehicles. FIG. 6 shows the same alternative embodiment in a perspective view. FIG. 7 shows a further embodiment of the system, which shows a modification of the frame 610 by extending the height of the frame.

Figure 8:
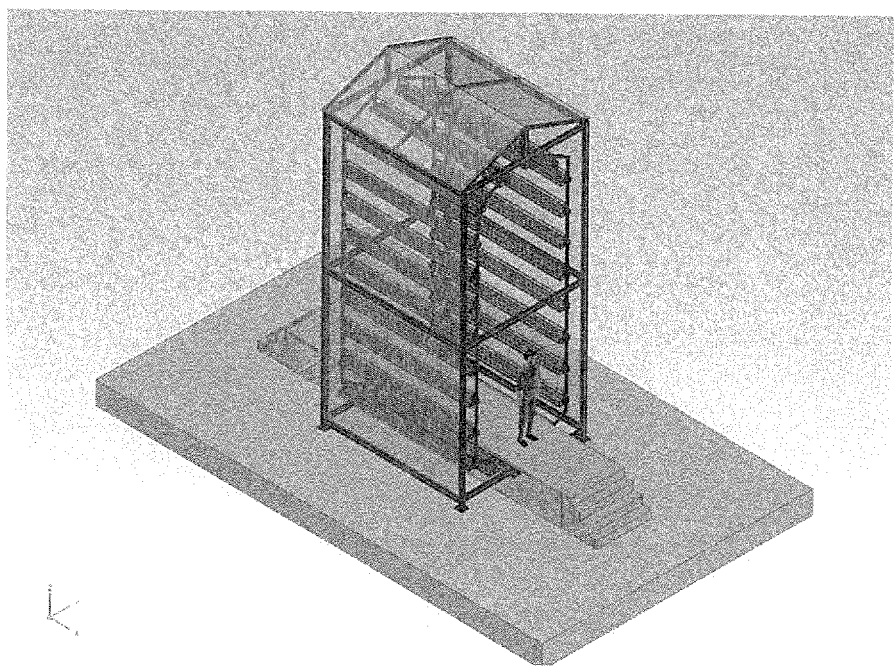
FIG. 8 shows a perspective view of the further embodiment shown in FIG. 7.

This shape would allow for more mobile trays 620 to be installed, providing more plants, while still allowing the mobile trays 620 to be rotated efficiently while requiring minimal manpower to maintain and service. FIG. 8 shows the same alternative embodiment in a perspective view.

Figure 9:
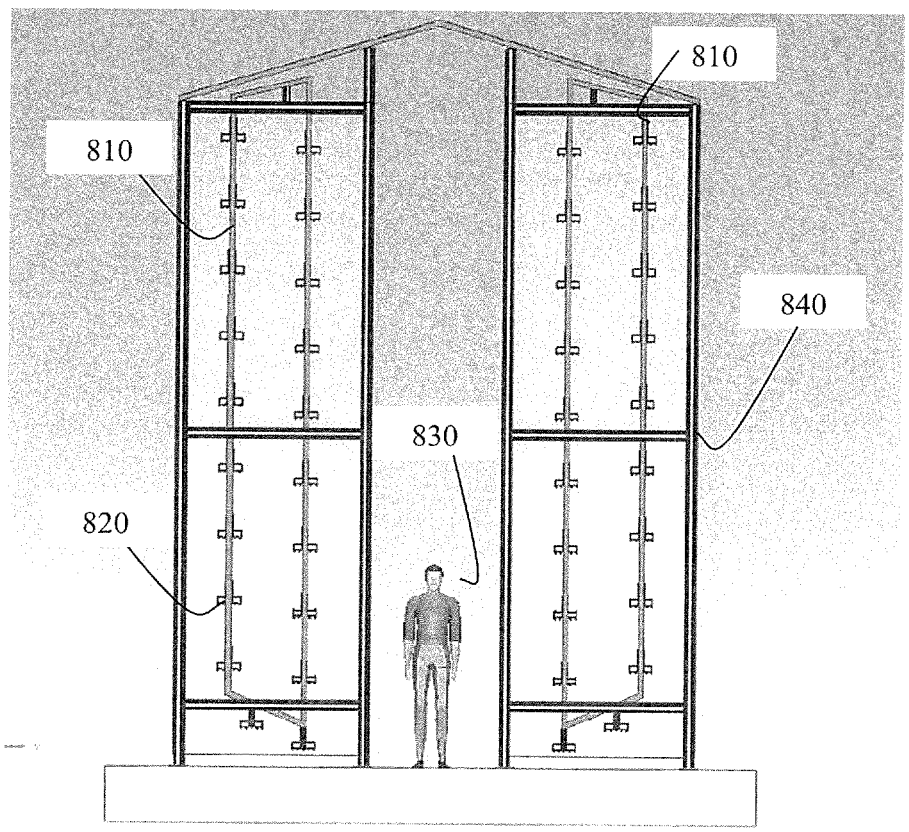
FIG. 9 shows an embodiment of the invention using multiple frames.
Figure 10:
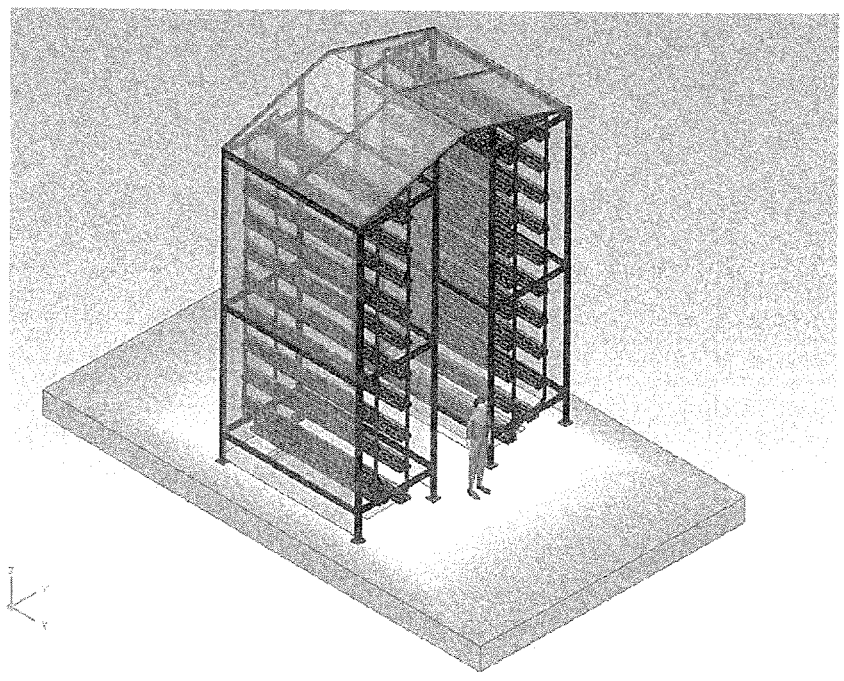
FIG. 10 shows a perspective view of the embodiment shown in FIG. 9.

FIG. 9 shows an embodiment of the system that uses multiple frames to provide shade and plant life in an efficient manner. This particular embodiment can be easily modified to create a standalone shelter for a vehicle or even multiple vehicles in a vehicle or car park. FIG. 10 shows the same alternative embodiment in a perspective view.

Figure 11:
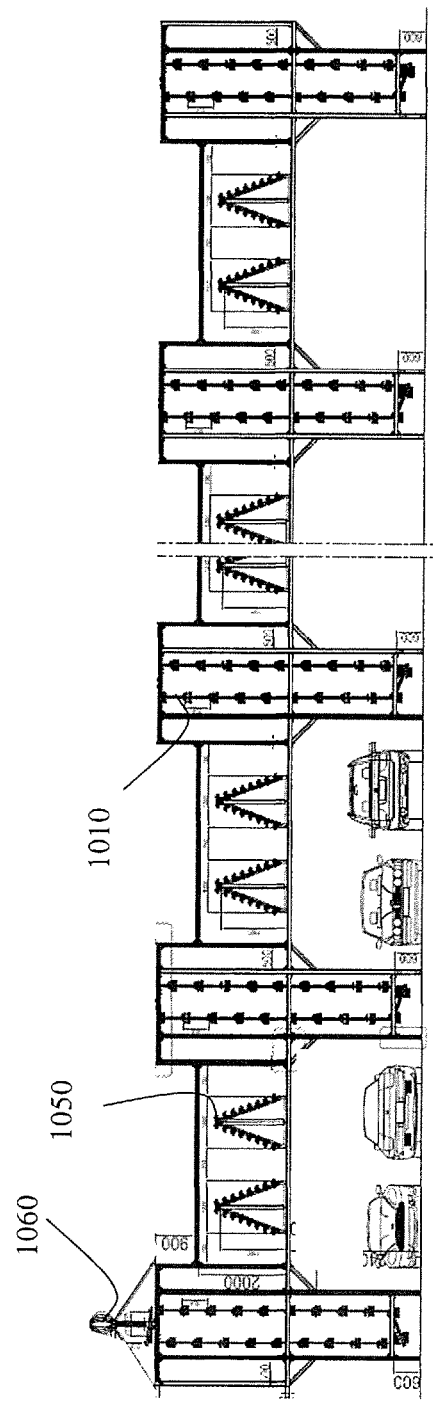
FIG. 11 shows an embodiment of the invention being used as a vehicle park shelter.

FIG. 11 shows multiple embodiments of the system 1010 in use for parking of vehicles. In the figures shown, the frames are shown to be substantially vertical for the purposes of saving space and further variations can be done where the frames are inclined. The embodiment shown also has a hydroponics rack 1050 (or box) installed in the space between the systems, although it can be appreciated that further variants of the rotatable rack system can also be installed in this space. The particular embodiment also shows a variant where drive mechanism is driven by wind power 1060 installed on the roof.

It is envisioned that multiple rotatable rack systems can be housed within a single greenhouse to take advantage of economies of scale. The rotatable rack systems can share a single storage tank, from which the water is pumped to the individual rotatable rack system to provide power to the drive mechanism as well as to irrigate the plants. A plumbing system can also be installed to ensure that only a single pump is require achieving a substantially equal pressure of water at each rotatable rack system. It would also be easier to control the environment of the greenhouse housing these systems to achieve an optimal growing scenario for the plants.

The above is a description of various embodiments of a rotatable rack system in accordance with this invention. It is envisioned that those skilled in the art may design alternative embodiment(s) without departing from the scope of the invention as set forth in the followings claims.

It should be further appreciated by the person skilled in the art that features and modifications as discussed in each embodiments above, not being alternatives or substitutes unless expressly stated, may be combined to form yet other embodiments that fall within the scope of the invention described.

The invention claimed is:

1. A rotatable rack system for growing plants, the rack system comprising:
   a frame comprising a first side, a second side, a bottom bar and a top bar;
   a plurality of mobile trays arrayed around the frame, each mobile tray for holding at least one plant;
   a chain linking said plurality of mobile trays together;
   a drive mechanism configured to drive the chain such that the plurality of mobile trays are driven on a path defined by a perimeter formed by the first side, the top bar, the second side and the bottom bar of the frame;
   wherein the frame is configured to support the plurality of mobile trays encircling an enclosed space;
   wherein the bottom bar and the top bar connect the first side and the second side of the frame, and the top bar is shorter than the bottom bar; wherein the first side comprises a first gradient relative to a ground and the second side comprises a second gradient relative to the ground, and wherein the first gradient differs from the second gradient,
   wherein the plurality of mobile trays are driven on the path having a length of a generally horizontal section near the top bar that is less than a length of a generally horizontal section near the bottom bar, wherein the plurality of mobile trays ascend at the first gradient and descend at a second gradient.

2. The rotatable rack system of claim 1, wherein the first side and the second side are arranged such that the mobile trays on the first side require less effort to drive than the mobile trays on the second side.

3. The rotatable rack system of claim 1, wherein the bottom bar and the top bar are slanted at an angle.

4. The rotatable rack system of claim 1, further comprising an irrigation system for supplying water to the rotatable rack system, wherein said irrigation system is adapted to supply water to the drive mechanism, wherein the drive mechanism comprises a water wheel; and wherein said irrigation system comprises a) a bath adapted to allow the mobile trays to at least partially immerse in; and b) a water tank configured to be in fluid connection with the bath.

5. The rotatable rack system of claim 4, wherein said water wheel comprises a controller capable of adjusting the rate of rotation of the water wheel, which affects the rate of movement of the chain; or a port for an external crank that is capable of allowing the water wheel to be rotated manually.

6. The rotatable rack system of claim 1, further comprising a chain guide that is capable of guiding the chain and locking the trays in place in the event of a break in the chain.

7. The rotatable rack system of claim 6, wherein each of said mobile trays are mounted via at least one attachment to the chain, the attachment configured to allow the mobile trays to rotate and maintain a substantially horizontal position; the attachment comprising a pivot point which is capable of allowing said mobile tray to swivel freely about the pivot point; said mobile tray is capable of being mounted distally from the pivot point via an extension arm, wherein said attachment comprises at least one ball bearing to allow the mobile tray to swivel freely.

8. The rotatable rack of claim 1, wherein said drive mechanism is powered by at least one electromagnet, or by one or a combination of water, wind, solar and electric power.

9. The rotatable rack of claim 1, wherein said drive mechanism is positioned within the enclosed space, wherein said enclosed space is capable of parking at least one vehicle.

10. The rotatable rack system of claim 1, wherein the chain rests substantially on the frame so that the mobile trays are driven on the path defined by the perimeter formed by the first side, the top bar, the second side and the bottom bar of the frame.

* * * * *